(No Model.) 2 Sheets—Sheet 2.
T. M. NICHOLS.
BELT CARRIER.
No. 415,921. Patented Nov. 26, 1889.
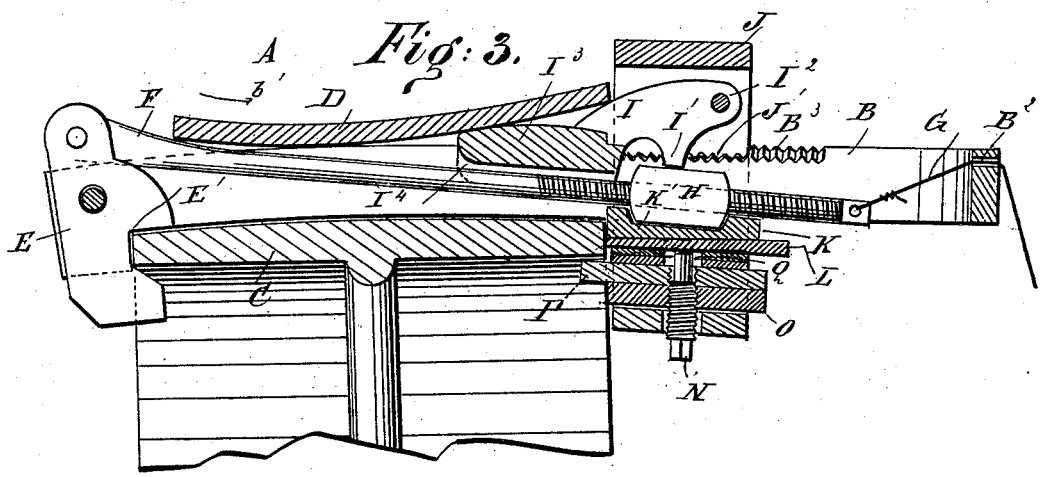
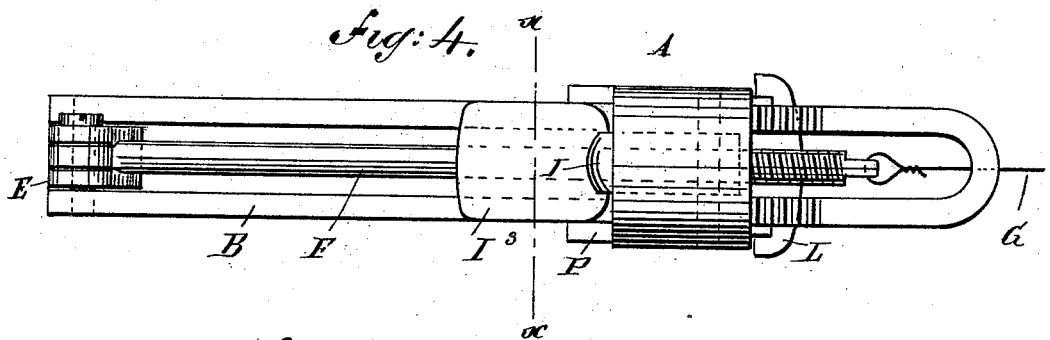
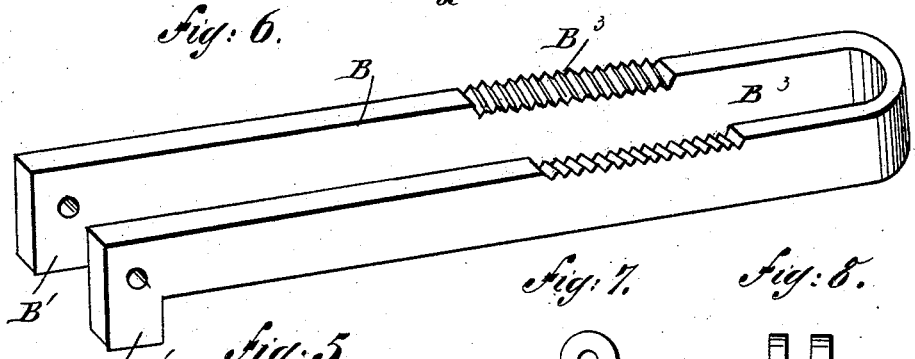
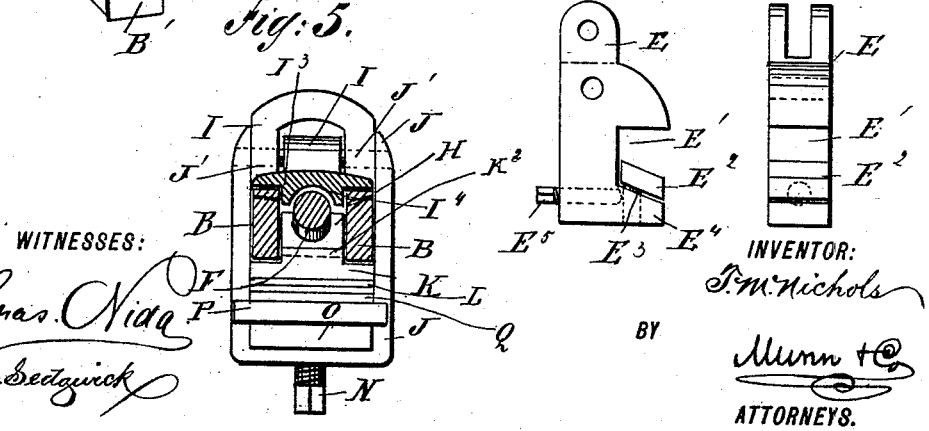
WITNESSES:
Chas. Nida
C. Sedgwick
INVENTOR:
T. M. Nichols
BY
Munn & Co.
ATTORNEYS.

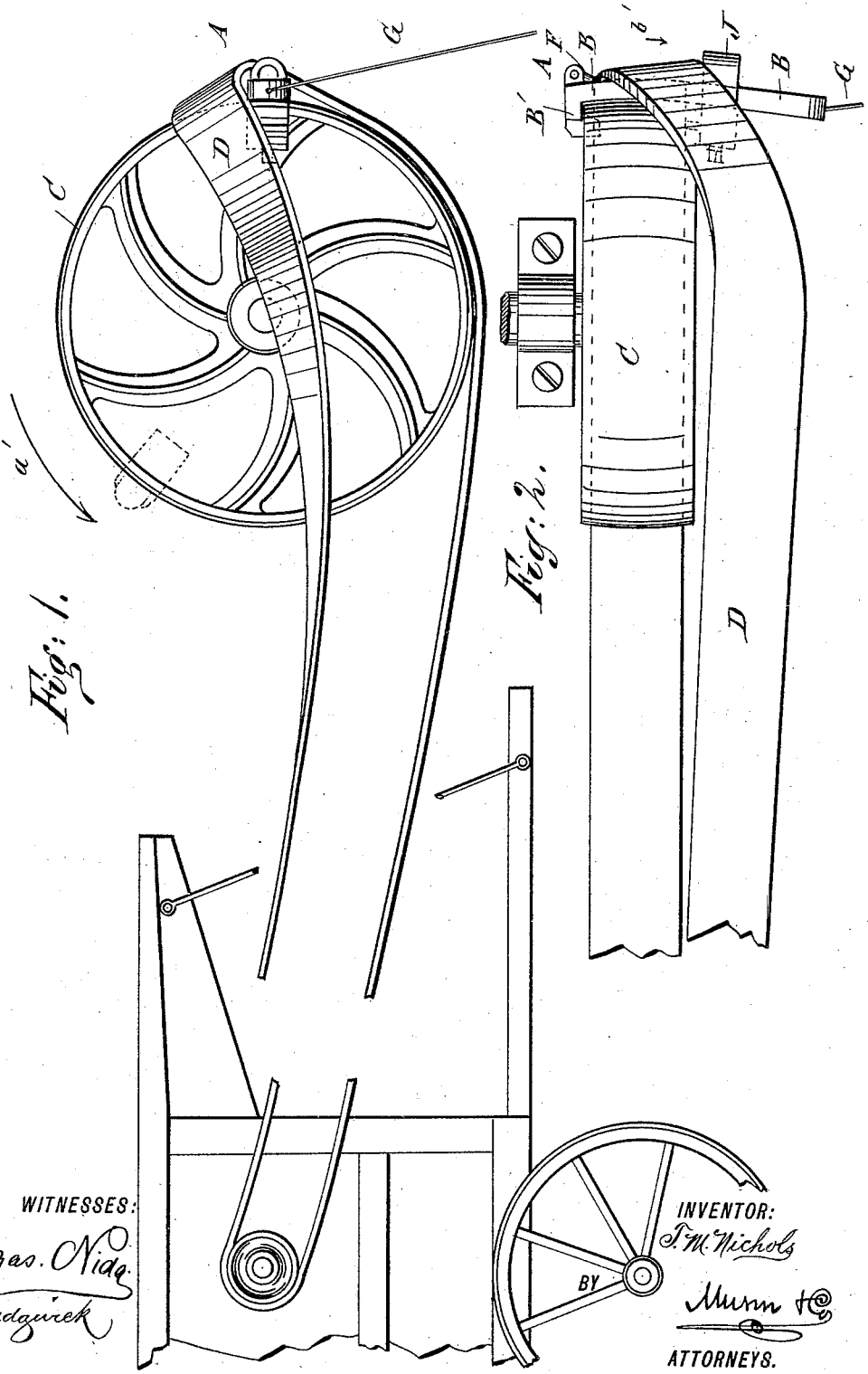

UNITED STATES PATENT OFFICE.

THORNTON M. NICHOLS, OF LEXINGTON, MISSOURI.

BELT-CARRIER.

SPECIFICATION forming part of Letters Patent No. 415,921, dated November 26, 1889.

Application filed July 20, 1889. Serial No. 318,171. (No model.)

*To all whom it may concern:*

Be it known that I, THORNTON M. NICHOLS, of Lexington, in the county of Lafayette and State of Missouri, have invented a new and Improved Belt-Carrier, of which the following is a full, clear, and exact description.

The object of the invention is to provide a new and improved belt-carrier which is simple and durable in construction, very effective in operation, and serves to conveniently and safely place the belt on the pulley or other wheel.

The invention consists of a belt-carrying frame adapted to be held on the rim of the wheel or pulley, and a clamping mechanism held on the said frame and adapted to engage and release the rim of the wheel.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement as applied. Fig. 2 is a plan view of the same. Fig. 3 is an enlarged sectional plan view of the improvement. Fig. 4 is a side elevation of the same. Fig. 5 is a transverse section of the same on the line $x\,x$ of Fig. 4. Fig. 6 is a perspective view of the frame. Fig. 7 is a side elevation of a clamp of modified form, and Fig. 8 is an end elevation of the same.

The improved belt-carrier A is provided with a U-shaped frame B, carrying on its ends the downwardly-extending lugs B', adapted to engage one edge of the rim of the wheel C, onto which the belt is to be placed. Between the ends of the U-shaped frame B is pivoted a latch E, provided with a notch E', adapted to engage one side of the rim of the wheel C, as is plainly shown in Fig. 3.

At the upper end of the latch E is pivoted a screw-rod F, to the free end of which is secured one end of a string G, extending upward and passing through an aperture $B^2$ in the middle part of the U-shaped frame B. On the screw-rod F screws a nut H, on the top of which presses a lug I', formed on a lever I, pivoted at $I^2$ on a box J, having notched offsets J', engaging by their toothed lower edges the teeth $B^3$, formed on the upper edge of the frame B, as is plainly shown in Figs. 3 and 6.

The teeth $B^3$ and the toothed lower edges of offsets J' are beveled inward, the object being to prevent the side bars of the frame B from being bent inward into the space provided for the nut H should they be subjected to undue strain, and to further insure this result the plate K is formed with a central raised portion $K^2$, Fig. 5, against the sides of which the said side bars would contact if bent inward.

On the free end of the lever I is secured a plate $I^3$, adapted to rest with its outer ends on the top edges of the frame B. On the under side of the plate $I^3$ is formed a recess $I^4$, fitting onto the top of the screw-rod F. The nut H is adapted to rest in a correspondingly-shaped notch K', formed in the top of a plate K, passing through the box J and supported on a plate L, against the under side of which screws a set-screw N, screwing in the plates O and P, resting on the bottom of the box J. The plate P projects somewhat at its inner end, so as to form, with the frame B, a notch for engaging the side of the rim of the pulley or wheel C opposite the latch E. (See Fig. 3.)

Between the plates L and P are arranged smaller plates Q, serving to fill the space between the plates L and P. The plate K is thus held adjustably in the box J, so as to change it in relation to the size of the wheel on which the belt is to be placed. The plate P is also adjusted so as to adjust the device according to the thickness of the rim of the wheel C.

The operation is as follows: The box J, with its plates, is adjusted on the frame B to correspond with the width of the pulley or wheel C onto which the belt is to be placed, so that the lugs B' and the plates K and L rest against the edges of the wheel C. The plate P engages the inner surface of one edge and the notch E' of the latch E fits over the other edge of the rim of the wheel C. When the device has thus been adjusted on the pulley or wheel C, it is in about the position shown in Fig. 1, the belt D being placed over the plate $I^3$ of the lever I and resting with one edge against the box J, which is of sufficient height to prevent the belt from slipping off. When the wheel or pulley C is now turned in the direction of the arrow $a'$, (see Fig. 1,) the belt-carrier holds the lower part of the belt stretched on the rim of the wheel C and carries the upper loose part of the belt over the upper quarter of the wheel C when the latter revolves. The operator has hold of the end of the string G, and when the belt-carrier has passed the position shown to the left of Fig. 1 in dotted lines the upper part of the belt is disconnected from the carrier A, and when the operator now pulls the string G he causes the screw-bolt F to swing upward, whereby the nut H presses on the under side of the lug I' and raises the lever I, and at the same time the nut H is disengaged from the recess K' in the top of the plate K. The pull on the string G causes the rod F to move transversely in the direction of the arrow $b'$, (see Figs. 2 and 3,) whereby the latch E is swung so that the top of the notch E' presses on the periphery of the rim of the wheel C, thus raising the frame B until the lugs B' are disengaged from the edge of the rim of the wheel C. At the same time the notch E' is disengaged from the edge of the rim of the wheel, and as the device is now moving downward with the wheel or pulley C it drops over the latter.

It will be seen that when the carrier supports the belt D, as shown in Fig. 1, the tension of the belt is exerted against the plate $I^3$, so that the lug I' of lever I, pressing on the nut H of rod F, and prevents the nut H on the said rod from disengaging from the recess K' in the plate K until the belt D has moved over the plate $I^2$ and the string G is pulled, as before described, whereby the tension on the string will lift the rod F and nut H and the latter will turn the lever I on its pivot.

The bottom of the notch E' may be made adjustable, as shown in Figs. 7 and 8, in which a plate $E^2$ forms the bottom and is secured on a pin $E^3$, mounted to slide vertically in the lip $E^4$, formed on the latch E. The set-screw $E^5$ serves to hold the pin $E^3$ in any desired position, according to the thickness of the rim of the wheel on which the belt is to be placed.

Having thus fully described my invention, I claim as new and desire to secure by Letters Patent—

1. A belt-carrier comprising a frame adapted to rest on the rim of a pulley or wheel and provided with means for retaining the belt on the frame over which it passes, and clamping mechanism carried by the frame for engaging the rim of the wheel or pulley, substantially as described.

2. A belt-carrier comprising a frame adapted to rest on the rim of the wheel or pulley and provided with means for retaining the belt on the frame over which it passes, a clamping mechanism held on the said frame and adapted to engage the rim of the wheel, and a string for releasing the clamping mechanism to detach the belt-carrier from the pulley or wheel, substantially as shown and described.

3. A belt-carrier comprising a frame provided with lugs adapted to engage one edge of the rim of the wheel or pulley, a box held adjustably on the said frame, a latch pivoted on the said frame, a rod pivotally connected with the said latch, and a lever pivoted in the said box and provided with a plate resting on a nut on the said rod and adapted to be pressed on by the belt to be carried, substantially as shown and described.

4. A belt-carrier comprising a frame provided with lugs adapted to engage one edge of the rim of the wheel or pulley, a box held adjustably on the said frame, a latch pivoted on the said frame, a rod pivotally connected with the said latch, a lever pivoted in the said box and provided with a plate resting on a nut on the said rod and adapted to be pressed on by the belt to be carried, and a string for swinging the said rod, substantially as shown and described.

5. A belt-carrier comprising a frame provided with lugs adapted to engage one edge of the rim of the wheel or pulley, a box held adjustably on the said frame, a latch pivoted on the said frame, a rod pivotally connected with the said latch, a lever pivoted in the said box and provided with a plate resting on a nut on the said rod and adapted to be pressed on by the belt to be carried, a string for swinging the said rod, and said nut screwing on the said rod and adapted to be locked in place in the said box, and also adapted to dislodge said lever when the said string is pulled, substantially as shown and described.

6. A belt-carrier comprising a frame provided with lugs adapted to engage one edge of the rim of the wheel or pulley, a box held adjustably on the said frame, a latch pivoted on the said frame, a rod pivotally connected with the said latch, a lever pivoted in the said box and provided with a plate resting on a nut on the said rod and adapted to be pressed on by the belt to be carried, a string for swinging the said rod, said nut screwing on the said rod and adapted to be locked in place in the said box and also adapted to dislodge said lever when the said string is pulled, and an adjustable plate held in the said box and provided with a recess engaged by the said nut, substantially as shown and described.

7. A belt-carrier comprising a frame provided with lugs adapted to engage one edge of the rim of the wheel or pulley, a box held adjustably on the said frame, a latch pivoted on the said frame, a rod pivotally connected with the said latch, a lever pivoted in the said box and provided with a plate resting on a nut on the said rod and adapted to be pressed on by the belt to be carried, a string for swinging the said rod, said nut screwing on the said rod and adapted to be locked in place in the said box, and also adapted to dislodge said lever when the said string is pulled, an adjustable plate held in the said box and provided with a recess engaged by the said nut, the said box and plate being adapted to engage the inner surface of the rim of the wheel or pulley, substantially as shown and described.

8. In a belt-carrier, the combination, with a frame provided with downwardly-projecting lugs, of a latch pivoted between the said lugs and provided with a notch adapted to receive the edge of the rim of a pulley or wheel, and means for locking the latch in position, substantially as described.

9. In a belt-carrier, the combination, with a frame provided with downwardly-projecting lugs, of a latch pivoted between the lugs and provided with a notch adapted to receive the edge of the rim of the wheel or pulley, and means for swinging the latch on its pivot to disengage its notch from the rim of the wheel, substantially as herein shown and described.

10. In a belt-carrier, the combination, with a frame provided with lugs, of a latch pivoted on the said frame between the said lugs and provided with a notch adapted to engage the edge of the rim of the wheel, means, substantially as described, for swinging the said latch so as to disengage the said frame from the rim of the wheel, and a box held adjustably on the said frame and adapted to engage the edge of the rim of the wheel or pulley opposite to the said latch and lugs, substantially as shown and described.

11. In a belt-carrier, the combination, with a frame and a box held on the said frame, of a lever pivoted in the said box and provided with a plate adapted to carry the belt, and a pivoted rod having a nut engaged by the said plate and serving to swing the said lever upward, substantially as shown and described.

12. In a belt-carrier, the combination, with a frame and a box held on the said frame, of a lever pivoted in the said box and provided with a plate adapted to carry the belt, a pivoted rod having a nut engaged by the said plate and serving to swing the said lever upward, and a recessed plate held in the said box and engaged by the nut on the said rod, substantially as shown and described.

13. In a belt-carrier, the combination, with a frame and a box held on the said frame, of a lever pivoted in the said box and provided with a plate adapted to carry the belt, a pivoted rod having a nut engaged by the said plate and serving to swing the said lever upward, a recessed plate held in the said box and engaged by the nut on the said rod, and a string secured to one end of the said pivoted rod and passed through an aperture in the said frame, substantially as shown and described.

THORNTON M. NICHOLS.

Witnesses:
CHAS. C. POWELL,
WILLIAM J. HOWE.